Patented May 4, 1954

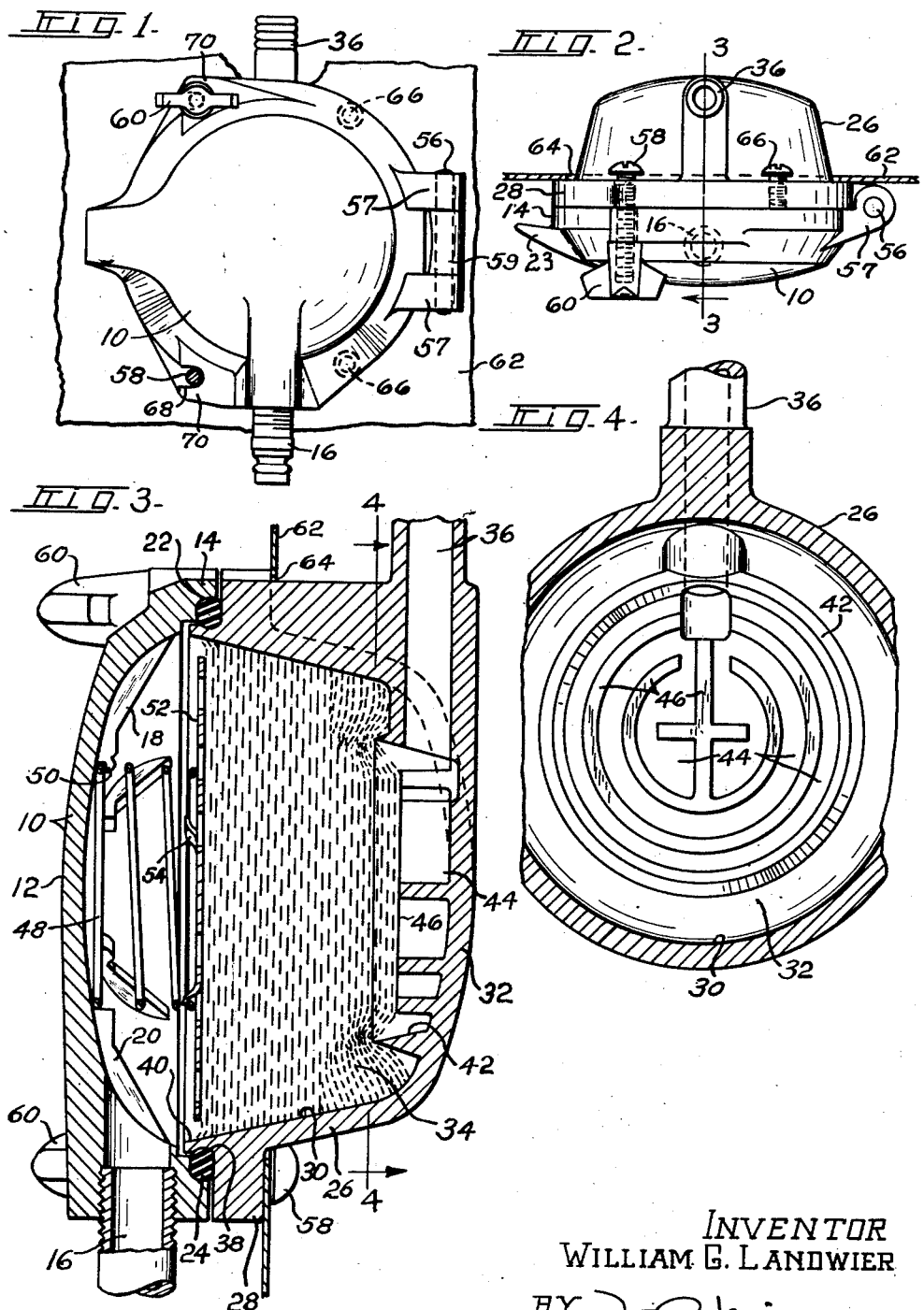

2,677,464

UNITED STATES PATENT OFFICE 2,677,464

FILTER

William G. Landwier, Fayetteville, N. Y., assignor to Easy Washing Machine Corporation, Syracuse, N. Y., a corporation of Delaware Application January 30, 1951, Serial No. 208,584

2 Claims. (Cl. 210—138)

This invention relates to filters, and more particularly to a filter adapted for domestic laundry appliance use.

In laundry appliances, particularly for domestic use, it is desirable to protect the laundry from possible staining and like impurities in the domestic water supply by passing such water through a filter adapted to expose the impurities to materials which have an affinity therefor prior to permitting the water to come into contact with freshly laundered clothes, as in a rinsing process. Such a filter preferably provides for relatively free flow of the domestic water supply therethrough while affording ample opportunity for the foreign matter to assimilate with the filter material, so that the outflow will be free of such impurities as might have a deleterious effect.

The present invention is directed to such a filter of relatively simple construction, and which may be safely used by users of domestic washing machines, the filter being constructed in a relatively fool-proof manner and being so arranged as to permit the ready removal and replacement of suitable filter material therein. In filters of the type described, the filter material ordinarily is such as to permit a relatively free flow of water therethrough, but upon the accumulation of swarf, the filter material may become blocked, creating a tendency for the water to bypass the filter material, thereby circumventing the object of the filter. The present invention is further directed to an arrangement in which the possibility of such bypassing is eliminated, the construction being such that no substantial care in loading the filter is required to secure this result.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevation of the filter mounted upon a panel of a washing machine;

Figure 2 is a top elevational view;

Figure 3 is a vertical section taken substantially on the line 3—3 of Figure 2; and Figure 4 is a transverse section taken substantially on the line 4—4 of Figure 3.

Referring to the drawings, there is shown a filter casing comprising a pair of shell-like casing members which may be readily cast of any suitable material such as aluminum alloy, iron, high strength plastic, and the like. The inlet shell member 10 has a central shallow dome-shaped portion 12, an annular rim 14 and an inlet connection 16. The shallow dome may be provided with a plurality of radial strengthening ribs such as 18 and 20, and the annular rim is provided with a shoulder-like annular recess 22 for cooperating with a sealing ring 24. A handle lug 23 is provided to assist opening the member.

The outlet shell 26 is provided with an annular rim 28, a tapered side wall 30 and bottom wall 32 forming a recess 34 for the reception of filter material. The bottom wall 32 has an outlet connection 36. The annular rim 28 has an annular shoulder recess 38 complemental to the recess 22, and adapted to cooperate with the sealing ring 24. The tapered wall 26 projects into the inlet shell as at 40 to provide such annular seat 38. The end wall 32 comprises an annular ridge 42 within which is a labyrinth of passages 44 bounded by lands 46, and as will appear in Figure 4, each of the grooves of the labyrinth 44 lead into the outlet connection 36.

The inlet shell 12 is adapted to carry a coil compression spring 48, one end of which is seated in a circular recess or area bounded by the inner ends of the ribs 18 and 20. Certain of the ribs such as 18 are provided with projecting tongues as 50 for securing the end turn of the coil spring 48 in position so as to be carried by the inlet shell member. The coil spring at its other end is affixed to a perforate pressure plate 52, secured to the other end turn of the coil spring 48 by a plurality of struck-up fingers 54.

The inlet casing shell and the outlet casing shell are preferably hinged upon one another for simplicity to one side as at 56, the shells being provided with integral hinge lugs such as 57 and 59. The shells are held in closed position by such hinge and a pair of clamping screws and wing nuts 58 and 60, respectively. The outlet shell is adapted to be mounted upon a panel such as 62 of a washing machine, such panel having an aperture 64 to receive the tapered wall 26, which may be projected therethrough. The outlet shell is secured to such panel by threaded fastening means 66, as well as the screws 58, all of which are threaded into the flange 28 of the outlet shell member. The inlet shell member is notched as at 68 to receive each of the screws 58 and suitable seats 70 are provided so as to squarely receive the thrust of the thumb nuts 60.

Any suitable filter material may be employed as may be desired. However, for general purposes, terry cloth disks, wadded terry cloth, or unsized cheesecloth may be placed within the recess 34, and it will appear from a consideration of Figure 3 that such filter material will be held within the recess under compression of the pressure plate 52, so that the body of filter material will be forcefully held in contact with the end wall and particularly the annular ridge 42 thereof. At the same time, the filter material will be supported upon the lands 46 defining the labyrinth 44. Such filter material will be of sufficient coarseness to permit relatively free flow of liquid therethrough, but at the same time, will be held sufficiently compacted by the pressure plate 52 so as to engage not only the tapered wall 30 but also the annular ridge 42, the effect of which is to prevent the domestic water supply from in any way bypassing the filter material, thus assuring that all of such water will be subjected to the affinity of the filter material for the foreign matter desired to be removed during the filtering process. Where a multiple layer of disks is employed, such disks will ordinarily be of slightly larger diameter than the major diameter of the tapered wall 30. Thus, as such disks become slightly clogged and the pressure drop through the filter material increases, the inlet pressure will tend to compact such disks against the tapered wall, thereby assuring against the possibility of bypass. Additionally, any increase in pressure upon the inlet side of the filter material will increase the pressure of the filter material upon the annular ridge 42, further assuring against the possibility of bypass.

It will appear from a consideration of the construction described that the filter may be readily loaded by removing the thumb nuts 60 and opening the inlet shell, and that after loading, the inlet shell may be swung to a closed position, the wing nuts replaced and tightened, whereby such filter material is automatically placed under a slight initial compression by reason of the pressure plate 52 and the spring 48. By reason of the tapered wall, when it is desired to unload the filter, it will be found that such material may be readily removed, leaving the outlet chamber in a relatively clean condition and ready for reloading.

It will be seen that the filter may readily be formed essentially from two relatively simple castings with a minimum of machining, and that the general arrangement is such that the filter will adequately withstand the domestic water pressures without leakage, which pressures tend to build up as the filter material becomes clogged.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A washing machine rinse water filter, comprising a pair of shell-like casing members forming an inlet member and an outlet member, the inlet member being of relatively shallow dome shape and having an inlet connection, a plurality of radial strengthening ribs on the internal surface of said dome shape member, said ribs extending centrally to a point short of the center to form a circular seat for a coil spring, a coil spring and pressure plate assembly, one end of said coil spring being positioned in said seat and the other having a perforate pressure plate secured thereto, certain of said ribs having inwardly extending fingers extending over said one end of said coil spring to secure the same in place, and the outlet member having a relatively deep filter material receiving recess bounded by a tapered side wall tapered inwardly in the direction of flow and a bottom outlet wall, a mass of filter material located in said recess, said outlet wall comprising a continuous annular integral upstanding ridge inwardly spaced from said side wall and an outlet labyrinth centrally disposed within the area defined by said ridge, said outlet labyrinth comprising an outlet connection extending laterally from and lying in the plane of said labyrinth, and a series of deep grooves and intervening lands integral with said bottom wall, said grooves being connected with said outlet, said lands and ridge supporting said filter material held thereagainst by said pressure plate, said inlet and outlet members each having relatively heavy annular rims, said tapered side wall extending into the dome shape member and forming a flange along the inner edge of the rim of the outlet member, an annular seal ring recess in the inlet member rim facing said flange and outlet member rim, a seal ring lying in said seal ring recess and engaging said flange and outlet member rim, and detachable means acting through said rims for securing said casing members together.

2. A washing machine rinse water filter, comprising a pair of shell-like casing members forming an inlet member and an outlet member, the inlet member being of relatively shallow dome shape and having an inlet connection, a coil spring and pressure plate assembly, one end of said coil spring being mounted upon the inside face of said inlet member and the other having a perforate pressure plate secured thereto, and the outlet member having a relatively deep filter material receiving recess bounded by a tapered side wall tapered inwardly in the direction of flow and a bottom outlet wall, a mass of filter material located in said recess, said outlet wall comprising a continuous annular integral upstanding ridge inwardly spaced from said side wall and an outlet labyrinth centrally disposed within the area defined by said ridge, said outlet labyrinth comprising an outlet connection extending laterally from and lying in the plane of said labyrinth, and a series of deep grooves and intervening lands integral with said bottom wall, said grooves being connected with said outlet, said lands and ridge supporting said filter material held thereagainst by said pressure plate, said inlet and outlet members each having relatively heavy annular rims, said tapered side wall extending into the dome shape member and forming a flange along the inner edge of the rim of the outlet member, an annular seal ring recess in the inlet member rim facing said flange and outlet member rim, a seal ring lying in said seal ring recess and engaging said flange and outlet member rim, and detachable means acting through said rims for securing said casing members together.

References Cited in the file of this patent

UNITED STATES PATENTS

| Number | Name | Date |
| --- | --- | --- |
| 183,599 | Sinclaire | Oct. 24, 1876 |
| 1,361,243 | Fuson | Dec. 7, 1920 |
| 1,475,577 | Green | Nov. 27, 1923 |
| 1,761,963 | Babitch | June 3, 1930 |
| 2,007,615 | Ross | July 9, 1935 |
| 2,023,423 | Kleckner | Dec. 10, 1935 |
| 2,190,305 | Auberschek | Feb. 13, 1940 |
| 2,400,719 | Stackhouse | May 21, 1946 |
| 2,522,904 | Slepica | Sept. 19, 1950 |

FOREIGN PATENTS

| Number | Country | Date |
| --- | --- | --- |
| 230,991 | Great Britain | Mar. 26, 1925 |